US005609732A

United States Patent [19]

Magidson

[11] Patent Number: 5,609,732
[45] Date of Patent: Mar. 11, 1997

[54] DISTILLING APPARATUS

[75] Inventor: Stanley I. Magidson, Morristown, N.J.

[73] Assignee: Genesis, An Environmental Corp., Morristown, N.J.

[21] Appl. No.: 403,475

[22] Filed: Mar. 14, 1995

[51] Int. Cl.⁶ ........................................ B01D 3/00
[52] U.S. Cl. .................. 202/83; 202/176; 202/185.3; 202/185.5; 203/2; 203/10; 203/12; 203/DIG. 18; 159/34
[58] Field of Search .................... 202/83, 185.3, 202/185.5, 197, 200, 206, 176; 203/2, 10, 12, DIG. 16, DIG. 18; 159/34

[56] References Cited

U.S. PATENT DOCUMENTS

| | | | |
|---|---|---|---|
| 4,052,267 | 10/1977 | McFee | 202/185 B |
| 4,135,984 | 1/1979 | Kirschmann | 202/83 |
| 4,339,307 | 7/1982 | Ellis, Jr. | 202/176 |
| 4,342,623 | 8/1982 | Loeffler | 202/83 |
| 4,464,227 | 8/1984 | Colwell | 202/170 |
| 4,818,344 | 4/1989 | Glucksman | 202/176 |
| 5,178,734 | 1/1993 | Palmer | 203/10 |
| 5,196,093 | 3/1993 | Weber et al. | 202/197 |

Primary Examiner—Christopher Kim
Attorney, Agent, or Firm—Sofer & Haroun, LLP

[57] ABSTRACT

A portable water distiller comprising a vaporization chamber containing an inclined electric coil heating element, a finned tube condenser coil and an electric fan. The heating element is provided with forward and rear portions, the forward portion being elevated relative to the rear portion with the thermostatic control means positioned above the forward elevated position and maintained in contact with the substantially uniform water level. Accordingly, when the uniform water level dips below the thermostatic control means, the heating element is immediately de-energized thereby preventing the residual heat in the heating elements from quickly evaporating the raw water in the raw water receptacle.

20 Claims, 6 Drawing Sheets

5,609,732

DISTILLING APPARATUS

FIELD OF THE INVENTION

This invention relates to an electrically operated domestic water distilling apparatus. More particularly, the present invention relates to a distilling apparatus operating at a small over pressure, so designed as to prevent the apparatus from over heating and to permit ready cleaning of the vaporization chamber and of the electric heating element.

BACKGROUND OF THE INVENTION

All known water distillers prior to the present invention comprise a closed vaporization chamber, a heating element located near the chamber bottom, a steam outlet located near the top of the chamber and leading to a usually finned condenser coil, a venting outlet and a fan which blows fresh air over the condenser surface. The vaporization chamber is usually removable so that it may be filled with raw water and to provide the removal of residues and sediments.

The aforementioned parts of known water distillers are prone to repeated problems which are generally recognized in the distillation industry. Attempts to deal with these problems are discussed in the patent literature. For example, prior art distillation apparatuses provide generally horizontal heating elements and do not provide for the immersion of the heating element when the heating element is de-energized. Upon de-energizing, the residual heat in the heating elements of these prior art apparatuses quickly evaporates the remaining raw water supply. Under such conditions, the heating element can easily overheat, producing smoke and possibly causing a fire. Moreover, users do not always seat prior art distillation apparatuses on a perfectly horizontal plane. In such cases, inclinations of only 2 degrees may lead to the rapid overheating of the heating elements, which as described above, may produce smoke and possibly cause a fire.

U.S. Pat. No. 4,818,344 to Glucksman discloses a portable water distiller having a vaporization chamber containing a horizontally oriented electric coil heating element, a condenser coil and an electric fan motor for cooling the condenser coils outer surface. The receptacle of the portable water distiller to Glucksman is automatically kept full with water up to a predetermined level and is readily removable from the distiller for cleaning the residue. However, there exists no means to prevent the residual heat in the heating elements from quickly evaporating the raw water supply in the receptacle. Moreover, if a user were to incline such a distiller more than 2 degrees, leaving part of the heating element exposed and not surrounded by raw water, this would lead to a rapid temperature increase, which would result in the aforementioned smoke and/or fire conditions.

Another type of distilling apparatus is disclosed in U.S. Pat. No. 4,342,623 to Loeffier. This invention is portable and has an insulated container for raw water and a removable cover for the container and, includes a low-pressure seal which engages the container wall. A condenser coil is provided in the cover, along with a motor driven fan; an inlet and outlet ports which are provided about the periphery of the cover to allow cooling air to be drawn into the cover over the condenser coil and motor. An inlet tube connected to the condenser coil receives steam generated by a heater connected to the container bottom. It is evident that dismantling and reassembling the unit for cleaning purposes—a task to be done at least once a week—is quite formidable.

A further type of water distiller is disclosed in U.S. Pat. No. 4,339,307 to Ellis, which comprises a boiler compartment and a water-filled condenser compartment, combined in one shell, but separated by a partition wall. A condenser coil is disposed in the condenser compartment, and the steam passing there through is condensed by the raw water in the upper compartment. A drain valve is provided in the boiler compartment, which serves to purge impurities collected in the boiler. The water level in the boiler is controlled by a float valve which admits raw water from the condenser compartment, the latter having a similar float valve serving to control its water level. However, there exists no means for cleaning the bottom of the boiler, and it is evident that sediment will accumulate both in the boiler container and on the electrical emersion heater. These elements can, therefore, only be removed by complete dismantling of the water distiller.

The primary drawbacks of these embodiments is that in order to clean the boiler, the evaporation space and the electric heater, if possible, it is necessary to completely disassemble the apparatus. Moreover, a further drawback of these embodiments is that there exists no mechanism to prevent the residual heat in the heating element from quickly evaporating the raw water supply.

OBJECTS AND SUMMARY OF THE INVENTION

It is an object of the present invention to provide an improved water distilling apparatus having a safety feature which prevents the heating element from overheating.

An additional object of the invention is to provide a heating element having forward and rear portions, the forward portion being elevated relative to the rear portion.

Another object is to provide a thermostatic control means positioned adjacent the forward portion such that when the water level dips below the thermostatic control means, the heating element is de-energized, thereby preventing the heating element from overheating.

It is a further object of the invention to provide a means for orienting the heating element so that the rear portion of the heating element is inclined relative to the forward portion as well as a means for dissipating the heat of the heating element.

The aforementioned objects, as well as others which will become apparent to those skilled in the art from the description set forth herein, are achieved by a inclined heating element dimensioned and arranged so that when the water level dips below the front portion of the heating element, the thermostatic control means de-energizes the heating element. Accordingly, as the thermostatic control means is positioned at the front portion and as the heating element is immediately de-energized, any residual heat in the heating element will not be sufficient to evaporate the raw water surrounding the heating element. The heating element is thus prevented from overheating.

The distilling apparatus of the present invention comprises a housing, a vaporization chamber and an electric heating element located in the bottom portion of chamber, a fin tubed condenser coil provided with a distilled-water outlet, and an electrically operated fan serving to cool the condenser. The characteristic features of the present invention are in the vaporization chamber and comprise a vertical vaporization chamber having a closed top and an open bottom and a raw water receptacle including a generally flat bottom and upstanding side walls distanced from the walls of the vaporization chamber. The open chamber bottom is positioned proximate the bottom of the receptacle so as to define a gap therebetween for the entry of water into the chamber interior. The water receptacle communicates with a portable water container in a manner causing the water level in the receptacle to remain at a predetermined level above the bottom end of the chamber. The electric heating element is positioned inside the chamber near the bottom end. The thermostatic control means or switch may be attached to the upper surface of the forward portion of the heating element so that in normal operation, it is in contact with the substantially uniform water level. Alternatively, the thermostat control means may be positioned above the rear portion as long as it is maintained at a suitable distance from the top surface of the rear portion. Accordingly, when the water level dips below the thermostatic control means when the supply of water is exhausted or when the apparatus is inclined or knocked over, the thermostatic control means causes the heating element to be de-energized thereby preventing the heating element from overheating due to its lack of exposure to raw water. Additionally, when the water level dips below the control means when the supply of water is exhausted or when the apparatus is inclined, the inclination of the heating element causes the heating element to be partially submerged thereby preventing the residual heat in the heating element from quickly evaporating the raw water supply in the raw water receptacle leading to the aforementioned smoke and fire conditions.

During assembly and in order to ensure that the rear portion of the heating element is inclined relative to the front portion of the heating element, a positioning means is provided for positioning the rear portion of the heating element in an inclined state. Additionally, this positioning means, which may be fabricated out of a stainless steel material, serves to dissipate heat generated by the heating element.

The water receptacle is supported in the housing of the apparatus in a manner permitting its ready removal for thorough cleaning and its subsequent insertion into its working position. The heating element and thermostatic control means is provided as a unitary module to facilitate assembly and removal of the electronic circuitry. In the preferred embodiment, the vaporization chamber consists of an upper portion containing a steam outlet and venting outlet and a separate lower portion surrounding the heating coil, which is normally tight seal connected to the upper portion, but is readily removable for cleaning and for access to the heating coil.

The raw water receptacle is positioned within the housing above the removable raw water tray to form a filling compartment positioned underneath the outlet opening of an inverted raw water can. The can opening is closed by a spring-loaded valve which, in its inverted state, is held open against a spring force by a vertical pin jutting out of the compartment. In this way, water flows out of the can and into the compartment only as long as the water level is low enough to permit air to enter the can to replace the outflowing water, whereby the water level in the compartment and in the main portion of the receptacle remains substantially constant. The compartment communicates with the main portion of the raw water receptacle by a small opening in an otherwise closed partition between the two portions, thus preventing large quantities of hot water from entering the filling compartment from the main portion surrounding the vaporization chamber.

The inclined electric heater coil when energized, heats the water inside the chamber above the boiling point, causing it to evaporate and to create steam pressure in the chamber sufficient to overcome the flow resistance in the condenser coil. This pressure lowers the water level in the chamber below the water level in the surrounding water receptacle, the condenser tubing and the water level in the receptacle being designed so as to maintain permanent immersion of the heating coil in the water. However, when the supply of raw water in the raw water can is exhausted, such that the water level in the surrounding water receptacle is lowered, the thermostatic control switch at the front portion of the heating element is activated thus de-energizing the inclined electric coil. By providing an inclined heating coil, and when the supply of raw water is exhausted, the thermostatic control means causes the heating element to be de-energized thereby preventing the residual heat in the heating element from evaporating the remaining raw water in the raw water receptacle will not evaporate all of the raw water causing the heating element to overheat.

The raw water in the main portion of the receptacle surrounding the vaporization chamber is heated by convection and conduction to a temperature below, but close to, the boiling point, causing organic volatiles, such as alcohols, ketones, oils and aldehydes to evaporate before the water enters the vaporization chamber through the bottom gap. The volatiles are evaporated to the top of the housing from where they are exhausted through a venting opening by the draft of an electric fan.

The filling compartment may be advantageously filled with activated carbon serving to absorb organic matter from the water before its entry into the main portion of the receptacle.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference numerals identify similar elements throughout the several views.

DETAILED DESCRIPTION OF THE PRESENTLY PREFERRED EMBODIMENTS

Figure 2:
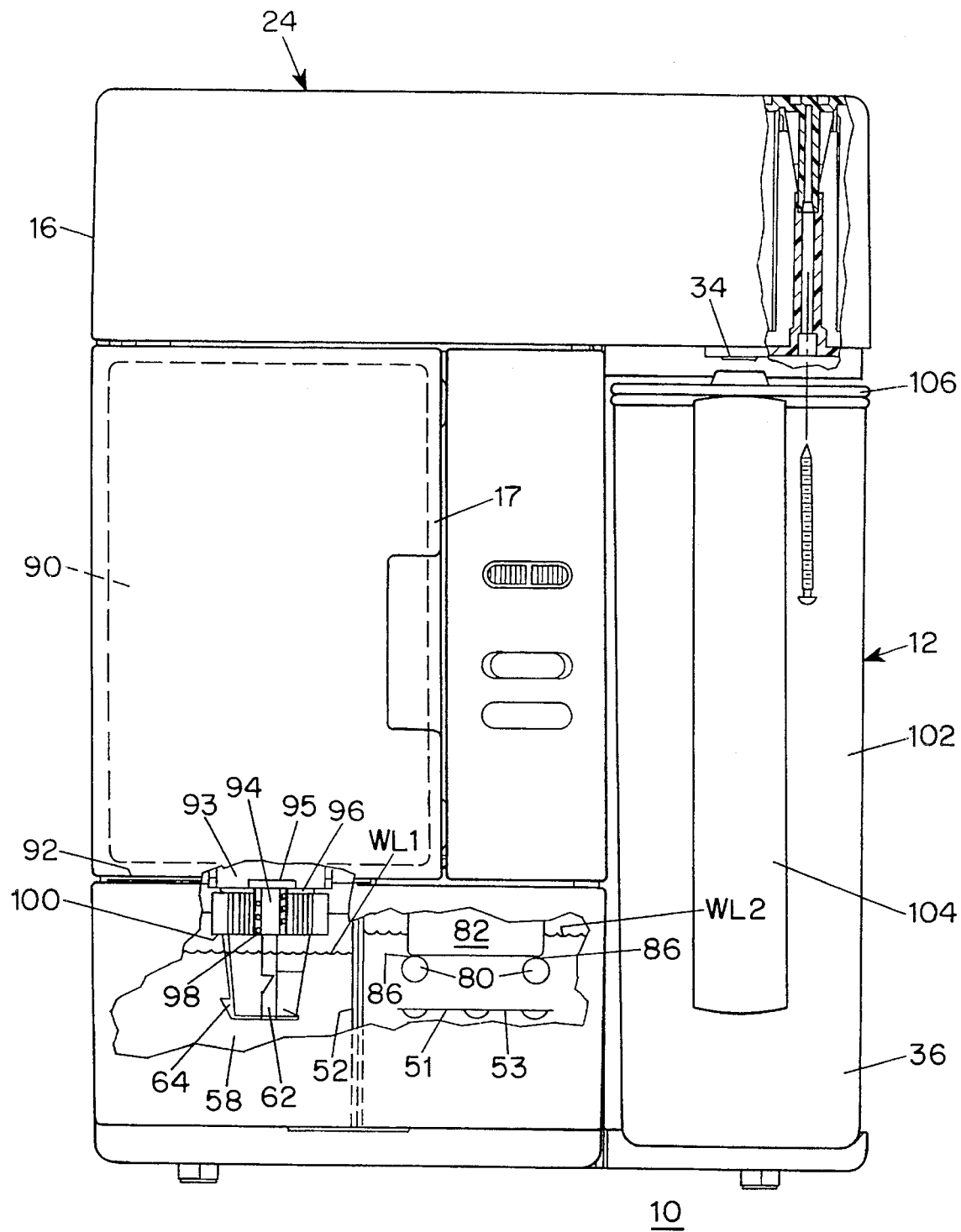
FIG. 2 is an elevation view, in partial cross section, of the water distilling apparatus of FIG. 1.
Figure 3:
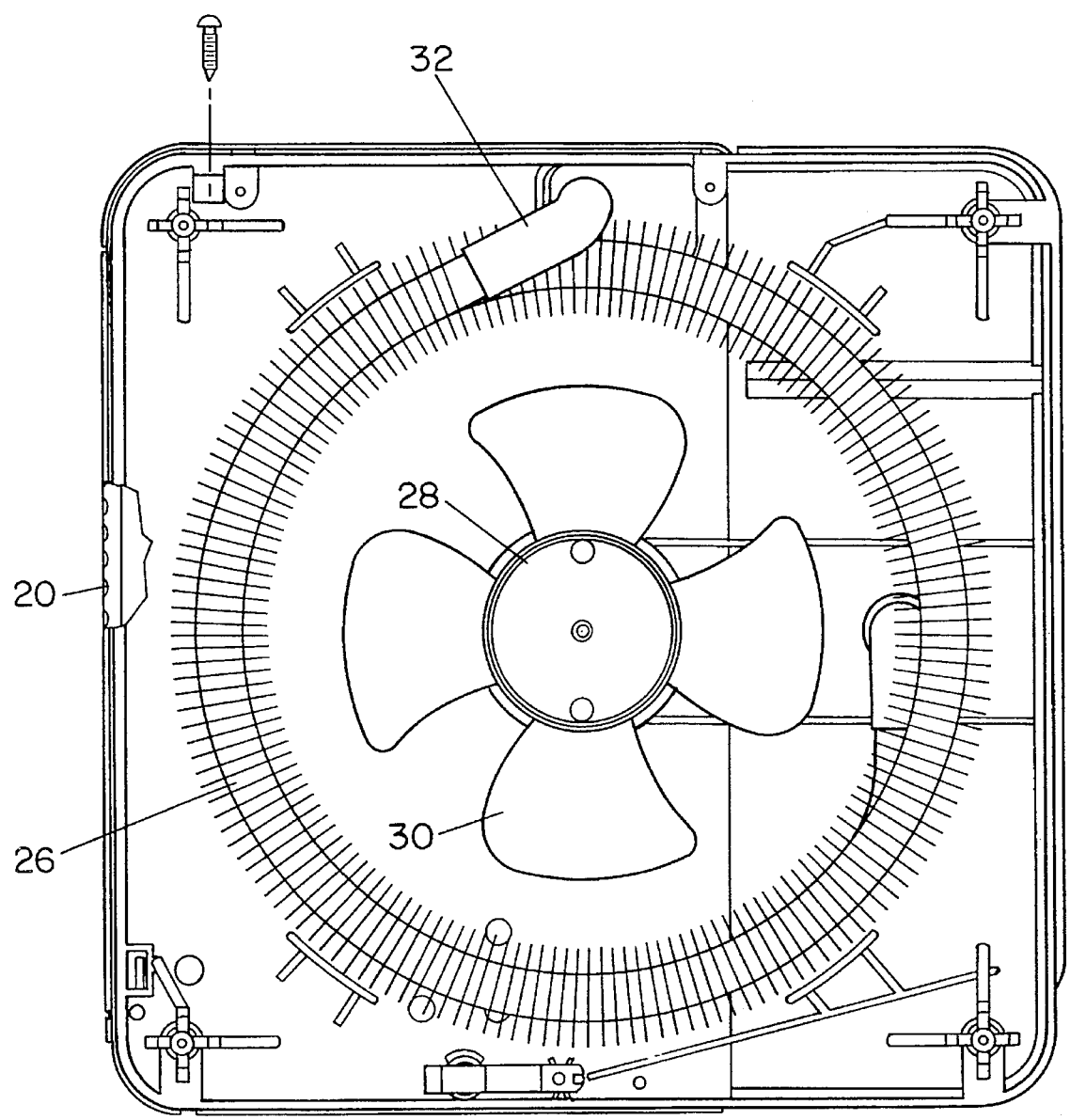
FIG. 3 is a top cross sectional view of the fin tubed condenser coil and electrically operated fan of the water distilling apparatus as shown in FIG. 1.
Figure 4:
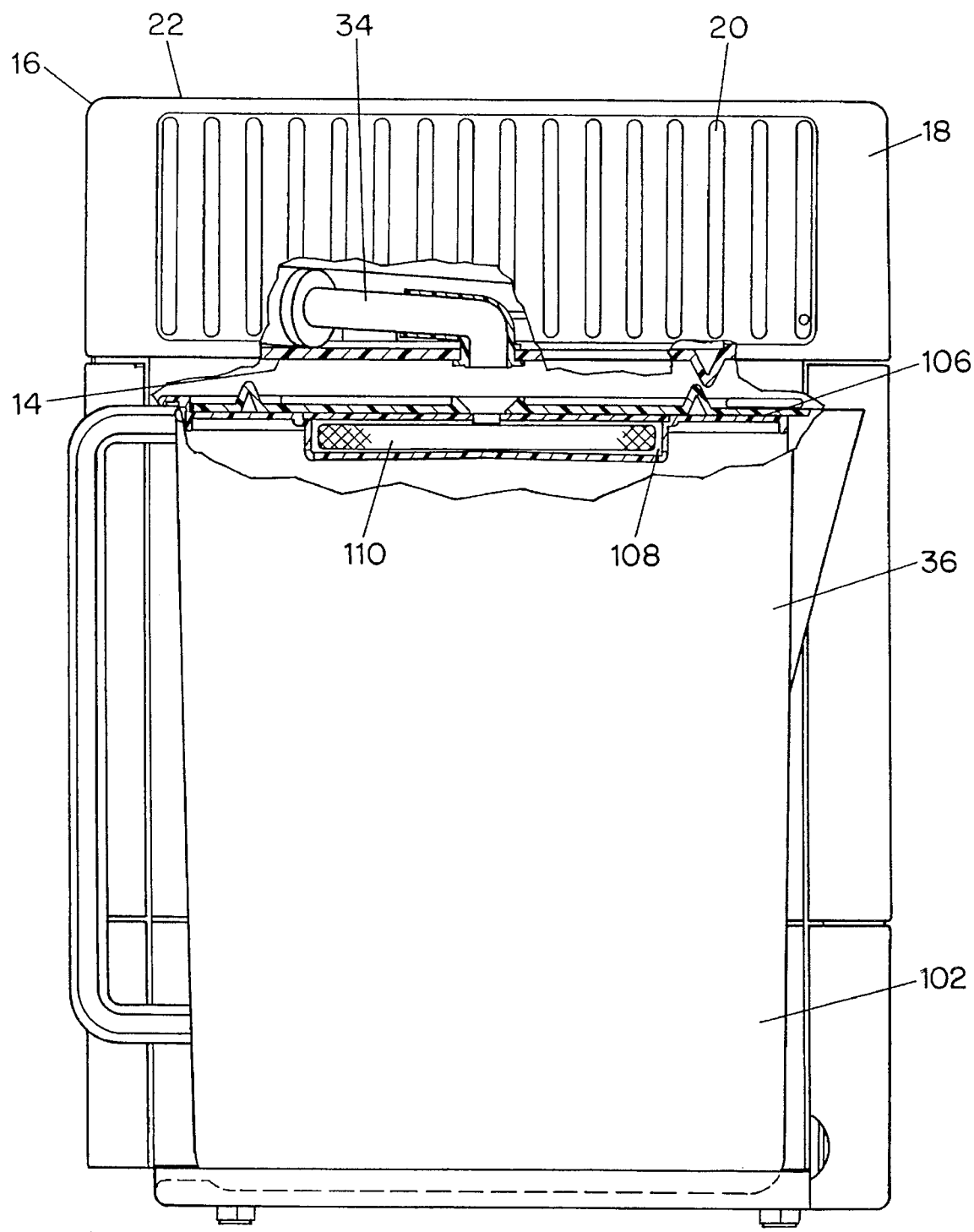
FIG. 4 is a side elevation view, in partial cross section showing the interior features of the distilled water outlet and the distilled water outlet and carbon activated media in the filling compartment.

With initial reference to FIG. 1, the distilling apparatus 10 constructed and arranged in accordance with the invention will now be described. Distilling apparatus 10 includes an outer housing 12, which is composed of several parts in order to facilitate mounting and assembly of the distilling components. A top portion 16 of the housing, as shown in FIGS. 2 and 4, is separated from a bottom portion 24 by a horizontal partition 14. The top portion 16 of the housing is provided with a side portion 18 having a plurality of openings 20 with a top side 22 of the top portion 16 being also provided with a plurality of openings (not shown). In this way, the plurality of openings 20 at the side portion 18 permit the entry of cold air while the plurality of openings on the top side 22 permit the exhaust of heated air. As shown in FIG. 3, a finned tube condenser coil 26 and an electric motor 28 and fan 30 are positioned in the top portion 16 in concentric alignment in order to cool and condense the steam generated by the vaporization equipment. A steam inlet 32 enters the condenser coil 26 at the top and a water outlet 34, as shown in FIG. 4, delivers distilled water into a receptacle 36. A venting outlet 33 (as shown in FIG. 5), vents the volatiles to the air.

Referring back to FIG. 1, the bottom portion 24 of the housing 12 contains the vaporization section of the distiller and comprises a vaporizing chamber 38 composed of a top section 40 in the shape of an inverted tube, and a bottom section 42, the two sections being interconnected.

Figure 6:
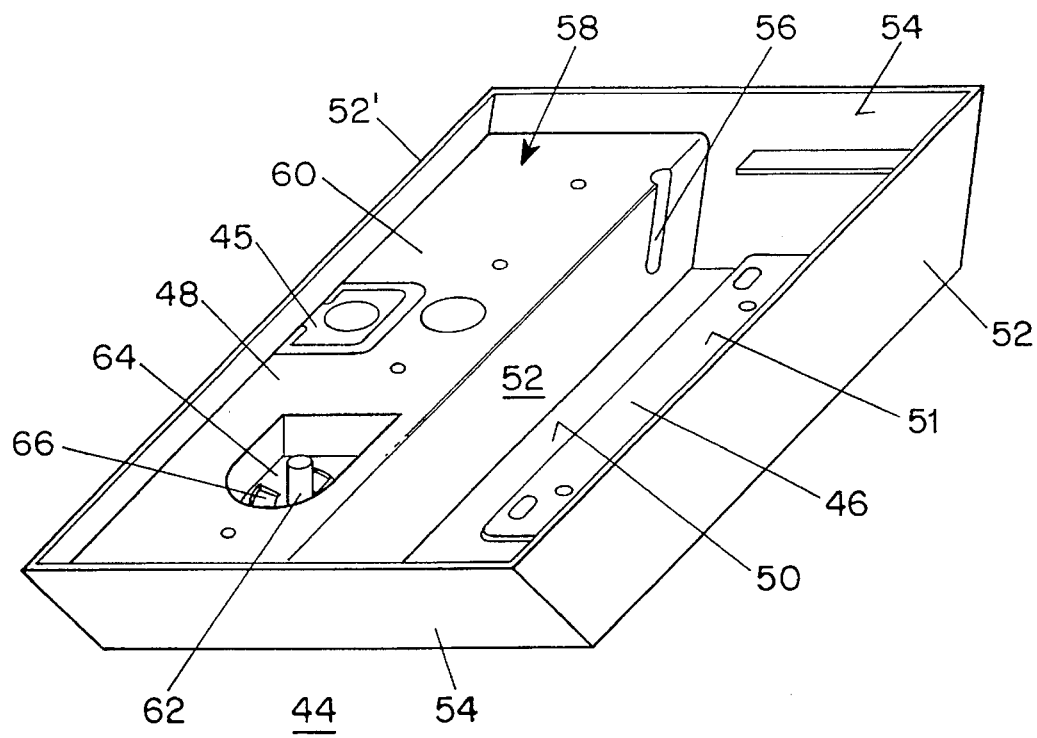
FIG. 6 is a perspective view of the removable raw water tray of the distilling apparatus of FIG. 1.

With reference to FIG. 6, the water to be evaporated is contained in a raw water receptacle 44 which consists of a main compartment 46 and a filling compartment 48. The main compartment 46 generally consists of a flat bottom 50, two upstanding side walls 52 and two sloping side wall 54. The bottom 50 of the main compartment 46 is provided with a raised metallic plate 51 which protects the main compartment. In the event of catastrophic failure of the heating element, the plate prevents the heating element, which may burst, from piercing the plastic bottom 50 of the main compartment 46. The filling compartment 48 is attached to one of the side walls 52 and communicates with the main compartment 46 by means of a small opening 56 in the upstanding side wall 52. The filling compartment 48 is provided with a tray insert 58 which is removable therefrom for easy cleaning.

Figure 5:
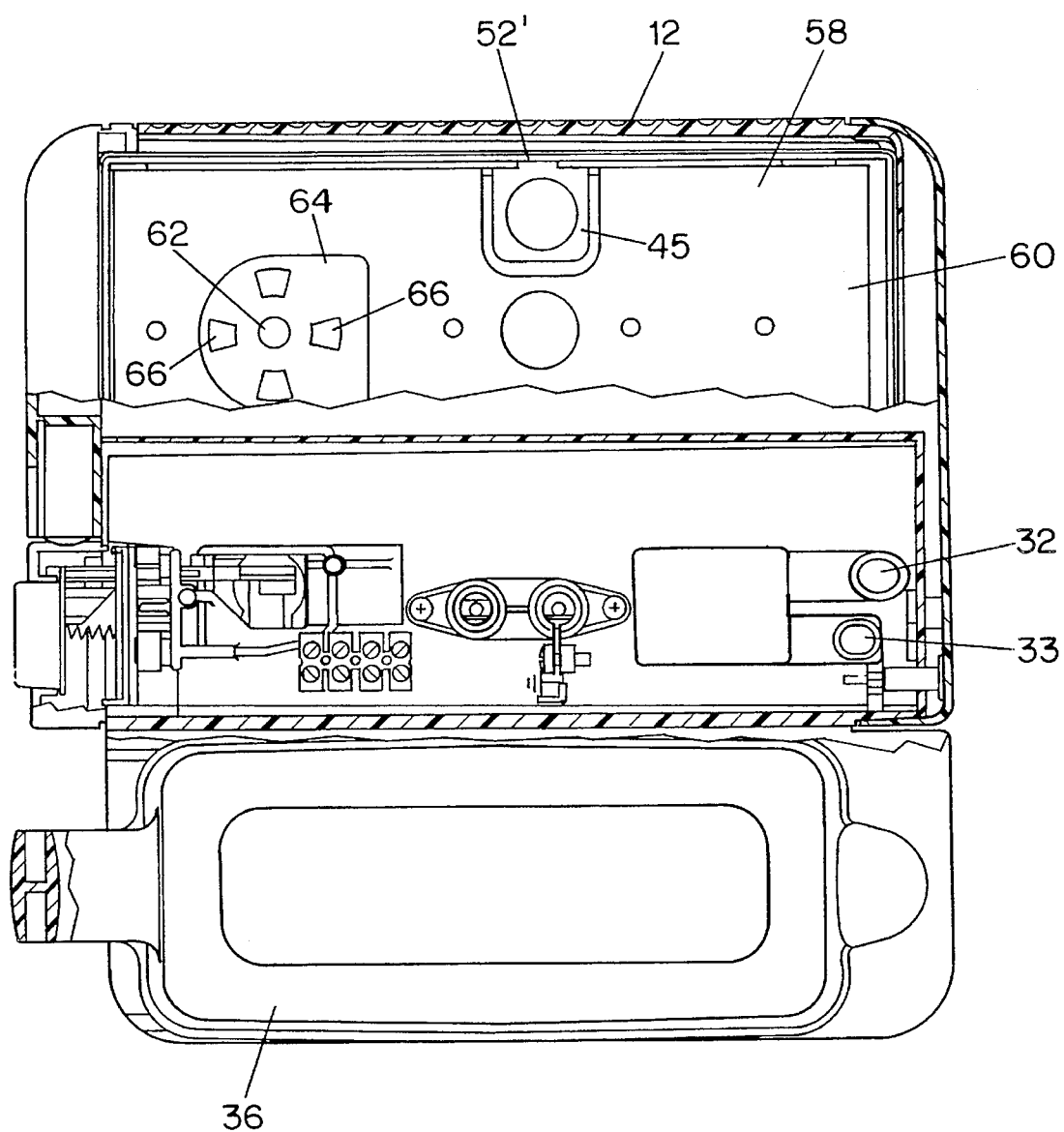
FIG. 5 is a top view, in partial cross section of the water distilling apparatus of FIG. 1.

As shown in FIG. 5, the tray insert 58 is provided with a catch 45 to facilitate securement of the insert 58 to the upstanding side wall 52'. The tray insert 58 is provided with a top surface 60 having a recess 64 which defines a vertical pin 62 jutting up from the bottom of the recess 64. This vertical pin 62 opens a valve in the raw water can, as will be described below. One or more openings 66 are provided in the recess 64 so that recess 64 is in communication with a space defined beneath the bottom surface of the tray insert 58.

Figure 7:
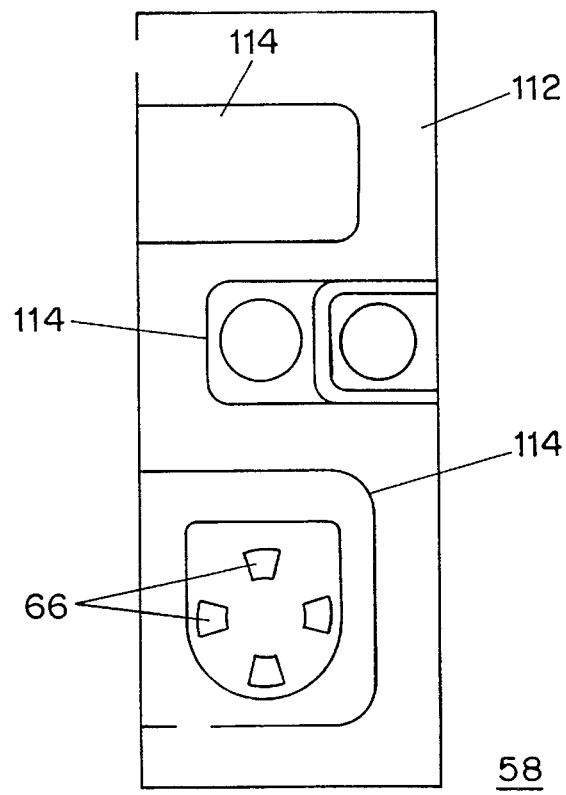
FIG. 7 is a bottom view of the removable raw water tray of FIG. 6.

Referring to FIG. 7, the bottom surface 112 of the tray insert 58 may be provided with a series of partitions 114 which form a maze-like conduit for the raw water rather than a direct path from the recess 64 to the small opening 56. By providing a maze-like configuration, the raw water takes longer to enter the main compartment 46 thus allowing the raw water to be pre-heated.

Figure 1:
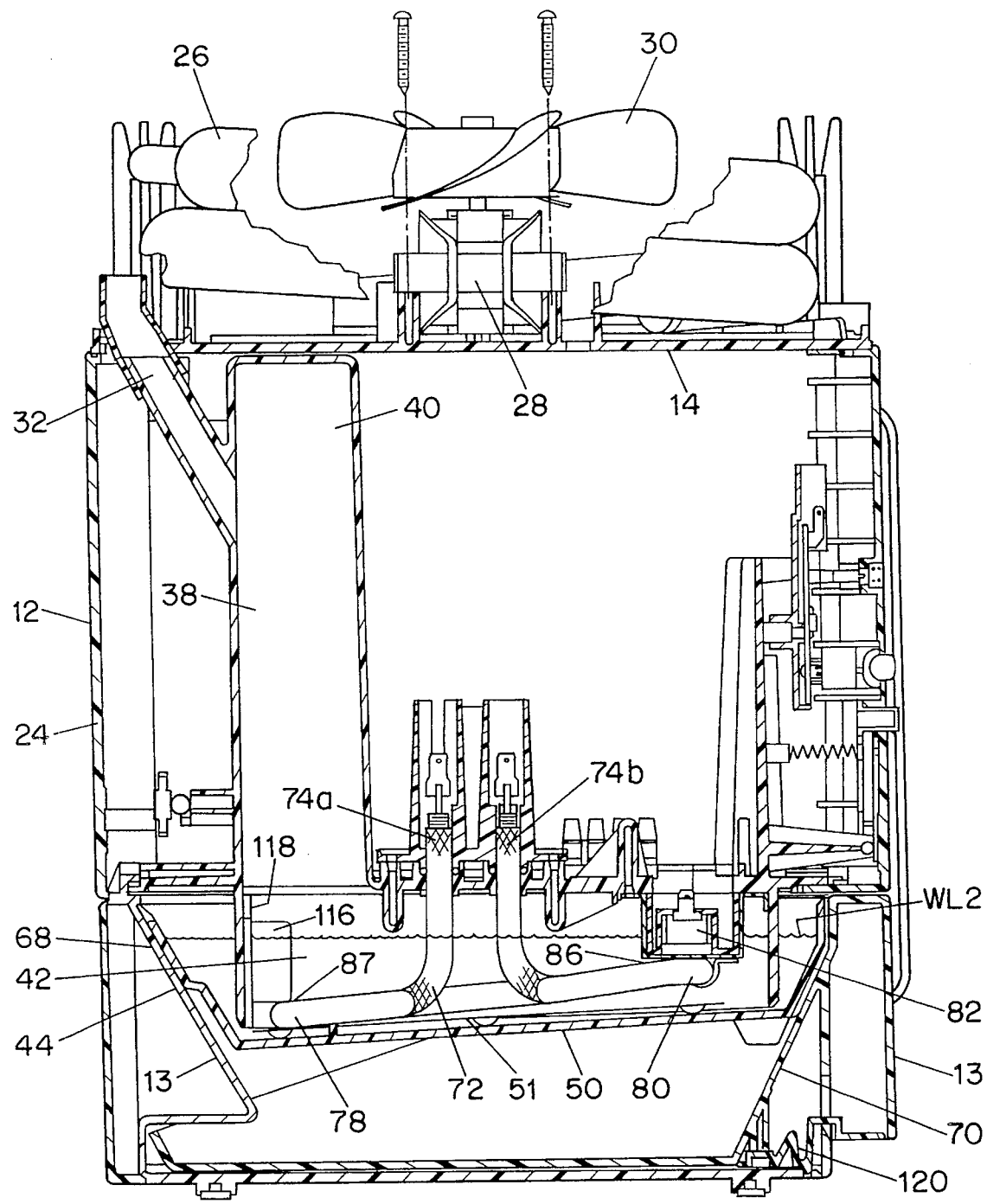
FIG. 1 is an elevation view, in partial cross section, of a water distilling apparatus constructed in accordance with the present invention, with the electric heating element being positioned in an inclined state.

As shown in FIG. 1, the raw water receptacle 44 is supported on and held in position on one side by a sloping wall 68 of a removable housing tray 13, and on the other side, by a sloping wall 70 of the housing 12. The housing tray 13 is removable from the housing 12 together with the raw water receptacle 44 to permit easy cleaning. A catch 120 may be provided to secure the housing tray 13 to the distiller housing 12.

An electric heating element 72 is positioned close to plate 51, the plate 51 being mounted proximate the bottom 50 of the main compartment 46. The electric heating element 72 has vertical conductor sections 74a, 74b extending through the closed top of the bottom vaporization section 42, the conductor sections 74A, 74B being sealed by a resilient stopper (not shown). The electric heating element 72 also comprises a first or rear portion 78 and a second or front portion 80, the second portion 80 being elevated relative to the first portion 78. As presently preferred, the inclination relative to a horizontal axis is about 5 degrees. In terms of a vertical height, the top surface 86 of the second or forward portion 80 is elevated about 8 millimeters relative to the top surface 87 of the first or rear portion 78.

A thermostatic control means or sensor 82 of a thermostatic switch (not shown) is positioned proximate the top surface 86 of the elevated forward portion 80 of the electric heating element 72. Specifically, the sensor 82 is positioned adjacent the forward portion 80 of the heating element, at an elevation of at least approximately 8 millimeters above the top surface 87 of the rear portion 78 of the heating element 72. Alternatively, the sensor 82 may be positioned at least approximately 8 millimeters along a vertical axis above the top surface 87 of the rear portion 78. As well, the sensor 82 and the heating element 72 may be surrounded by a metallic housing 118 and formed as a unitary one piece modular unit to facilitate assembly and removal for repair or replacement.

Referring to FIGS. 1, 2 and 6, raw water is brought to the distiller apparatus 10 by means of a raw water can 90 which is supported, in upturned state, by platform 92 extending sideways from the main housing 12. Preferably, the housing 12 also includes a door 17, pivotable about a vertical axis for providing access to the can 90, the housing 12 including a spring mechanism for securing the pivotable door in a closed position. The can opening 93 is closed by a spring-loaded valve 95 which includes a valve body 94 and a valve seat 96. In the upturned position of the can, the vertical pin 62 in the recess 64 of the tray insert 58, urges the valve body 94 off the valve seat 96 against the force of the spring 98, and water flows out of the can 90 into the recess 64, and from there, through openings 66 and into the filling compartment 48. From the filling compartment 48, water flows through opening 56 into the main compartment 46. The water rises up to the rim 100 around the can opening, whereafter no more water can flow out, since no air can enter the can through the opening. The water level is marked WL1, and water enters the main compartment 46 and the vaporizing chamber 38 up to the same level, which is kept at a short height above the heating element, resulting in the ability to heat small volumes of water, thus permitting quick vaporization.

As soon as the electric heating element 72 is energized, the water in the chamber 38 is heated to the boiling point and starts to evaporate, thereby creating a pressure sufficient to overcome the flow resistance of the condenser tubing 26. This pressure lowers the water level in the chamber (marked WL2) and remains at a sufficient height above the surface of the heating element 72, due to the duly dimensioned size of the condenser tubing. Steam leaves the vaporizing chamber 38 and enters the condenser coil 26, where it is converted to pure water and delivered to the receptacle 36 through the water outlet 34, with cooling air being provided by the electric motor 28 and fan 30.

Thereafter, the distilled water is delivered through water outlet 34 to a water collection receptacle 36 which includes a main body portion 102, a handle 104 secured to the main body portion 102 and a cover 106 for covering the main body portion 102. The cover 106 is provided with a chamber 108 for receiving a filter media 110 so that the distilled water exiting from the distilled water outlet 34 must pass through the filter media 110 (as shown in FIG. 4) prior to entry into the body portion 102 of the water collection receptacle 36. Preferably, the filter media 110 is made out of charcoal.

However, when the supply of raw water in the raw water can 90 is exhausted such that the water level in the raw water receptacle 44 is lowered or when the apparatus 10 is inclined or knocked over, the sensor 82 of the thermostatic control switch is activated thus de-energizing the inclined electric element 72. By providing an inclined heating element 72, a greater volume of water surrounds the heating element 72, which allows the residual heat in the heating element 72 to dissipate within the larger volume of water as compared with a horizontally disposed heating element. As well, by providing the inclined heating element 72, this allows the heating element to be submerged in raw water when the apparatus is inclined at an angle less than the inclination of the heating element 72, namely 5 degrees, thus preventing the overheating of the heating element 72. In this way, the residual heat in the heating element 72 is prevented from evaporating all of the raw water in the raw water receptacle 44. Accordingly, the thermostatic control means or sensor 82 is positioned above the forward elevated portion 80 of the heating element 72 and maintained in contact with the substantially uniform water level so that when the uniform water level dips below the sensor 82, the heating element 72 is de-energized, preventing the heating element 72 from overheating.

In order to maintain the positioning and inclination of the heating element 72, a means for positioning 116 the rear portion 78 of the heating element 72 is provided. In this way, the desired inclination of 5 degrees may be achieved. The positioning means 116, which may be fabricated out of stainless steel, also serves to dissipate heat.

For the purpose of cleaning, the raw water receptacle 44 is taken out of the housing as shown in FIG. 2 by lowering the raw water receptacle and withdrawing it from the housing for cleaning purposes. Specifically, the raw water receptacle 44 is moved away by opening housing door 17. This motion removes the supporting wall 60, 70 from the receptacle, resulting in its slipping downward along the sloped wall 70. As soon as the bottom end of the vaporizing chamber has been cleared, the receptacle 44 can be taken away for cleaning its bottom section of sediments and residues. Thereafter, the raw water can 90 may be slid off platform 92. As is evident, the raw water receptacle 44 must be first removed prior to the removal of the can 90.

An important result of the present inventions design of the vaporization chamber is the vaporization of volatiles, such as ketones, alcohols, oils and aldehydes from the water surface in the receptacle portions surrounding the vaporization chamber. The water in this portion is heated by proximity to the boiling water in the chamber by convection and conduction, to a temperature somewhat below the boiling point of water (about 90° celsius) sufficient to remove volatiles before the water enters the vaporization chamber. The evaporated gases rise to the top of the housing below partition 14 and escape into the top portion through top where the volatiles are carried into the open by the suction of the fan. It should be understood that the preferred embodiments and examples described are for illustrative purposes only and are not to be construed as limiting the scope of the present invention which is properly delineated only in the appended claims.

What is claimed is:

1. A water distilling apparatus comprising:
    a vaporizing module comprising an electric heating element and a thermostatic control means for preventing overheating of said heating element, said heating element having forward and rear portions, said forward portion of said heating element being elevated relative to said rear portion;
    a condensing module, said condensing module including a condenser coil in fluid communication with said vaporizing module by a steam conduit and defining an outlet conduit for permitting outflow of water therefrom;
    a fan operable to direct cooling air over a portion of said condenser coil to cool said condenser coil;
    means for supplying raw water to said vaporizing module, and means for receiving distilled water from said condensing module;
    wherein said vaporizing module comprises a raw water receptacle including a removable raw water tray, said removable raw water tray including a main compartment having bottom and upstanding side walls, and a filling compartment for supplying raw water up to a predetermined height, said filling compartment communicating with said main compartment through an opening effecting a substantially uniform water level in said filling department and in said main compartment, said heating element positioned below said substantially uniform water level so that said heating element is surrounded by raw water;
    a vertical vaporizing chamber having a closed top and open bottom of smaller horizontal dimensions than those of said main receptacle compartment of said vaporizing module and positioned in said main compartment adjacent and distanced from the bottom of said compartment; and
    wherein raw water is supplied to said receptacle by means of a can provided with an opening including a spring-loaded valve serving to close said opening and adapted to be positioned in an upturned state and with said opening placed over said filling compartment, a vertical pin intregal with said compartment urging said valve into an opened state.

2. The water distilling apparatus of claim 1, wherein said thermostatic control means is positioned above said forward elevated portion and maintained in contact with the substantially uniform water level so that when said uniform water level dips below said thermostatic control means, said heating element is de-energized thereby preventing said heating element from overheating.

3. The water distilling apparatus of claim 1, further comprising means for positioning said rear portion of said heating element and for maintaining said forward portion elevated relative to said rear portion.

4. The water distilling apparatus of claim 1, wherein said thermostatic control means is positioned adjacent said forward portion of said heating element and at an elevation of at least approximately 8 millimeters above the top surface of the rear portion of said heating element.

5. The water distilling apparatus of claim 1, wherein said thermostatic control means is positioned above said rear portion and at an elevation of at least approximately 8 millimeters above the top surface of said rear portion of said heating element.

6. The water distilling apparatus of claim 1, further comprising an outer housing which contains said vaporizing module and said condensing module.

7. The water distilling apparatus of claim 6, further comprising first and second wedge shaped supporting walls for facilitating translation of said raw water receptacle along a vertical axis for insertion and removal, and for positioning said raw water receptacle in engagement with said electric heating element.

8. The water distilling apparatus of claim 1, wherein said can is provided with a rim surrounding said valve, said rim serving to control the water level in said receptacle by preventing air from entering said can from below, as soon as the water level has reached said rim.

9. The water distilling apparatus of claim 1, wherein the water level in said filling compartment and in said main compartment is maintained at a distance approximately above said heating element and in contact with said thermostatic control means by means of said spring-loaded valve in said opening of said can.

10. The water distilling apparatus of claim 1, wherein said heating element and said thermostatic control means for preventing said heating element from overheating is surrounded by a metallic housing, said heating element, thermostatic control means and said housing comprises a unitary one piece modular unit.

11. The water distilling apparatus of claim 1, wherein an angle of about 5 degrees is defined between said heating element and a horizontal axis.

12. The water distilling apparatus of claim 1, further comprising a housing, said housing provided with a door pivotable about a vertical axis for providing access to said can.

13. The water distilling apparatus of claim 12, wherein said housing further includes a spring means for securing said pivotable door in a closed position.

14. The water distilling apparatus of claim 1, wherein said can is restricted from removal by said removable raw water tray, and wherein removal of said can necessitates prior removal of said removable raw water tray.

15. The water distilling apparatus of claim 1, further comprising a water collection receptacle for collecting said distilled water exiting from said distilled water outlet.

16. The water distilling apparatus of claim 15, wherein said water collection receptacle includes a main body portion, a handle secured to said main body portion and a cover for covering said main body portion, said cover having a chamber for receiving a filter media, so that distilled water exiting from said distilled water outlet must pass through said filter media prior to entry into said body portion of said collection receptacle.

17. The water distilling apparatus of claim 16, wherein said filter media is carbon.

18. The water distilling apparatus of claim 1, wherein said forward portion of said heating element is positioned proximate the open bottom end of said vaporizing chamber and said rear portion positioned away from the open end of the open bottom of said vaporization chamber.

19. A water vaporizing apparatus comprising:
- a heating element having forward and rear portions;
- a thermostatic control means for preventing overheating of said heating element;
- a means operable for at least partially immersing said heating element in water;
- wherein said forward portion of said heating element is elevated relative to said rear portion when said water vaporizing apparatus is in operation;
- a water receptacle operable for at least partially immersing said heating element in water, said water receptacle having a removable water tray, said removable water tray having a main compartment in communication with a filling compartment wherein said heating element is positioned below a substantially uniform water level so that the heating element is surrounded by water.

20. A water distilling apparatus comprising:
(a) a vaporizing module comprising:
   (I) a heating element having forward and rear positions;
   (ii) a thermostatic control means for preventing overheating of said heating element;
   (iii) a water receptacle operable for at least partially immersing said heating element in water;
   (iv) wherein said forward portion of said heating element is elevated relative to said rear portion in said water receptacle when said water vaporizing module is operating;
(b) a condensing module comprising:
   (I) a condensing conduit; and
   (ii) a condenser coil in fluid communication with said vaporizing module by said condensation conduit;
(c) a cooling means operable to cool at least a portion of said condenser coil;
(d) a means for supplying water to said vaporizing module;
(e) a means for collecting condensed water from said condensation conduit of said condensing module; and
(f) a removable filling tray insert positioned in said water filling compartment, said removable filling tray insert having a top side and a bottom side and including a series of baffles mounted on said bottom side so as to preheat the raw water prior to entry into the main compartment.

\* \* \* \* \*